Feb. 16, 1965  H. C. MASON  3,169,646
LUMBER STACKER
Filed Aug. 18, 1961  3 Sheets-Sheet 1
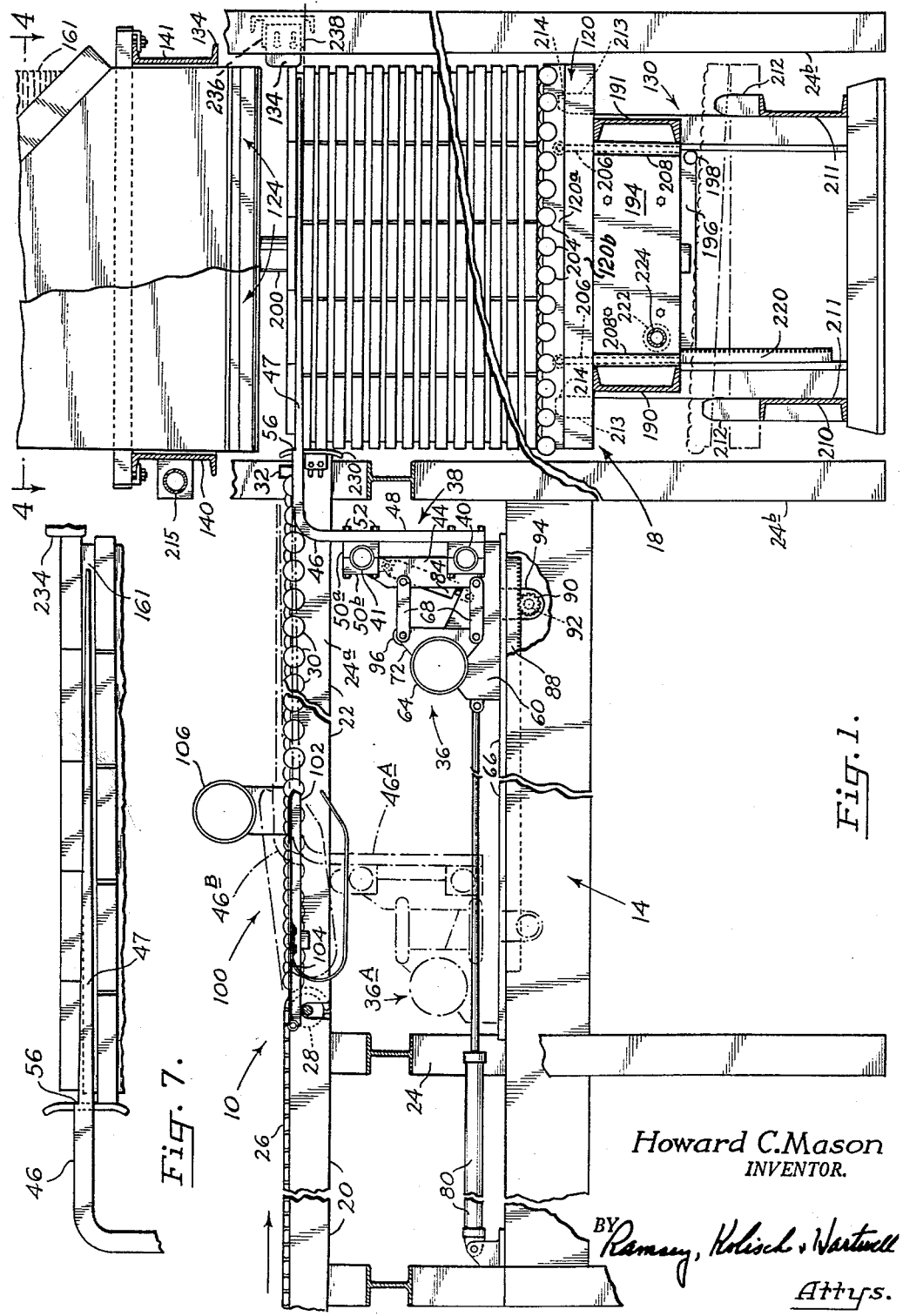
Howard C. Mason
INVENTOR.
BY Ramsey, Kolisch & Hartwell
Attys.

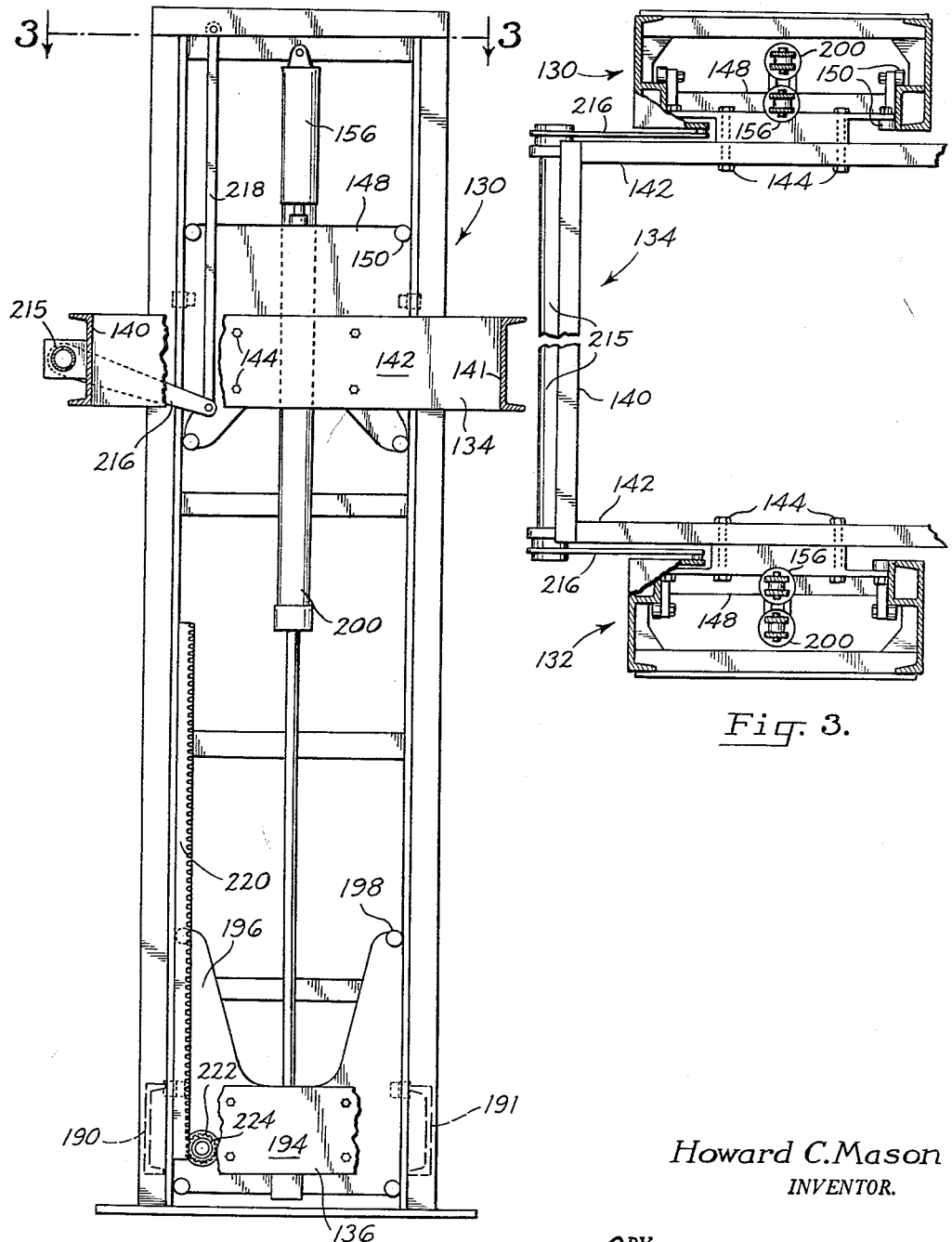

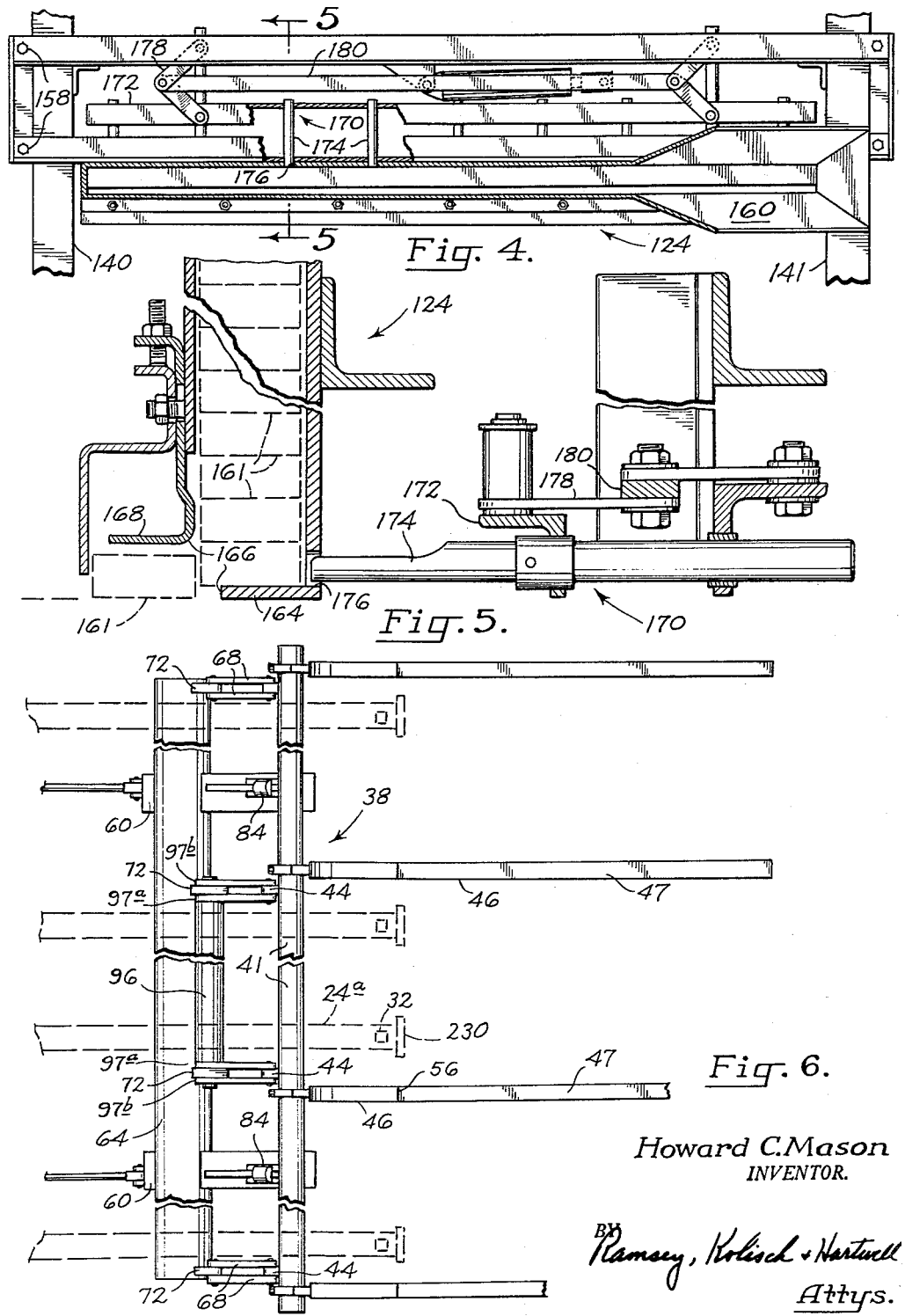

United States Patent Office 3,169,646
Patented Feb. 16, 1965

3,169,646
LUMBER STACKER
Howard Carl Mason, Oregon City, Oreg., assignor to
The Fryer Corporation, Portland, Oreg., a corporation
of Oregon
Filed Aug. 18, 1961, Ser. No. 132,453
13 Claims. (Cl. 214—6)

This invention relates to article handling apparatus, and more particularly to apparatus for stacking articles such as boards in a stack, with the stacking being done rapidly and neatly, and in a highly practical and satisfactory manner. Features of the construction include a novel pickup section, where boards lying edge to edge on a feed conveyer are picked up and then shifted forwardly to a point beyond the conveyer; novel means for controlling movement of boards down the feed conveyer, with such being regulated by movements of the pickup section; a novel construction for a platform that functions as a depository for stacked boards in the stacker; and a novel construction for applying stickers or spacers between successive layers of boards, in cases where spacing between the successive layers is desired.

A practical method of packaging articles such as boards, for storage or other purposes, is to stack the boards in evenly formed stacks. Usually the boards in a stack have substantially uniform thickness, and the boards arrange themselves in successive layers. In cases where it is desired to treat the boards after stacking, such as by drying them, or to allow for air circulation between the layers of boards, or for other reasons to provide spacing between successive layers, spacers in the form of elongated strips or "stickers" are placed between successive layers. These are positioned usually so that they extend transversely of the boards in a stack, and are provided at intervals spaced along the length of the boards. It is a general object of the invention to provide apparatus for stacking boards substantially as described, that will perform the stacking efficiently, with a minimum amount of supervision.

In a lumber stacker, its speed of operation and capacity are often directly related. Further, as a general rule it can be said that the greater the capacity of a machine, the more economical its use. Another object of the invention, therefore, is to provide an improved lumber stacker that is fast acting, and capable of handling boards flowing at a relatively fast rate and substantially continuously into the stacker.

A still further general object is to provide an improved stacker, that offers flexibility in operation. Any adjustments needed in the stacker to change it for handling different lengths, sizes, or types of boards may easily and quickly be made.

Other objects of the invention include the provision of a stacker that operates to form a stack of even width, with the boards along the sides of the stack exactly aligned vertically; to provide a stacker that affords good visibility of the boards forming the stack during the operation thereof; to provide a stacker devoid of complicated gearing and other power-transmitting machinery, and one where movements of operating parts therein are produced by relatively simple, fluid-actuated rams; to provide, in machines such as a stacker where boards are lifted from a feed conveyer and then transported forwardly, a novel pickup section for so removing boards, and means for controlling the flow of boards over the feed conveyer whereby the flow is substantially unhindered by operation of the pickup section; and to provide a stacker where the movements of operating parts therein are precise, and such result is produced without excessive mass or bulk in the parts.

Other related features and objects of the invention will become more fully apparent, as the following description is read in conjunction with the accompanying drawings, wherein:

FIG. 1 is a side view of a lumber stacker, constructed according to an embodiment of this invention, with portions of the stacker removed better to illustrate details of construction;

FIG. 2 illustrates hoist mechanism, in that part of the stacker where the stack forms and where stickers are applied to the top of the forming stack, with portions removed, and broken away;

FIG. 3 is a cross-sectional view, taken generally along the line 3—3 in FIG. 2;

FIG. 4 is a view looking downwardly at a hopper structure in the stacker, such view being taken generally along the line 4—4 in FIG. 1, and being drawn on a slightly larger scale;

FIG. 5 is a cross-sectional view, taken along the line 5—5 in FIG. 4, and drawn on an even larger scale, illustrating details of ejecting mechanism provided at the base of a hopper structure therein;

FIG. 6 is a top, plan view, of mechanism in the stacker referred to as a pickup section, and illustrating load-supporting forks in the pickup section, such forks being illustrated in an extended position (the position of the forks shown in solid outline in FIG. 1); and FIG. 7 is a side view of a fork, on a somewhat enlarged scale, showing the fork and its relation to a spacer or "sticker" laid therebeside.

Referring now to the drawings, and first of all particularly to FIG. 1, the stacking apparatus shown comprises, in general, elongated feed conveyer means indicated at 10, a pickup section 14 (where boards on the feed conveyer are lifted off the conveyer and then shifted forwardly and beyond the end thereof), and a stacking station, indicated generally at 18. In stacking station 18, the boards are stacked in layers, and, as will be described, means is provided for supporting a stack as it forms, and for applying stickers or spacers to the top of the stack whereby proper spacing is produced between the top and a succeeding layer of boards placed thereon.

In the embodiment of the invention illustrtaed, conveyer means 10 comprises a pair of conveyer sections 20 and 22. These are mounted on a suitable frame 24. Conveyer section 22 is in horizontal alignment with, and constitutes a continuation of, conveyer section 20. Boards travel in the direction of the arrow in FIG. 1, which is from the feed end to the off-bearing end of conveyer means 10.

Conveyer section 20 typically comprises a series of elongated and continuous conveyer belts, such as chain belt 26, distributed at laterally spaced intervals over the width of the conveyer section. The ends of the reaches of the belts are trained over sprockets, such as sprocket 28. Conveyer section 22 comprises plural rows of skate rollers 30, journaled on frame members such as member 24a of the frame, with the rows distributed laterally over the width of the conveyer means 10 in the same manner as chain belts 26. In the construction, conveyer section 22 is a free-rolling conveyer, the rollers thereof not being rotated under power, whereas conveyer section 20 is a powered conveyer, such ordinarily being driven by suitable motor means (not shown).

Positioned at the right or off-bearing end of each row of skate rollers 30 there may be positioned a stationary block 32 secured in a suitable manner to beams 24a of frame 24 (reference now is also made to FIG. 6 where the beams and blocks are shown in dashed outline). These blocks are aligned transversely of the conveyer, and they protrude above the level of the tops of the rollers 30, such level being the support plane of conveyer sections 20, 22. The rear faces of these blocks constitute a stop means in the construction operable to limit the travel of boards forwardly off the forward end of conveyer section 22. In operation of the stacker, boards traveling down conveyer section 20 collect on conveyer section 22, and as they are crowded together on section 22 are forced by boards following into tight edge-to-edge contact, with the lead board urged against blocks 32.

Pickup section 14, provided for lifting edge-butted boards from conveyer section 22, transports such boards forwardly beyond the off-bearing end of conveyer means 10 over a forming stack. In general terms, the pickup section comprises carriage structure 36 mounted below the support plane of conveyer section 22, and movable to and fro in a horizontal direction generally paralleling the movement of conveyer means 10, and a shiftable section 38 mounted on structure 36 and movable between raised and lowered positions relative to the carriage structure.

With reference again to FIGS. 1 and 6, shiftable section 38 comprises a pair of elongated and rigid tubes or mounting bar means 40, 41, disposed one above the other, and secured together by struts 44. Tubes 40, 41 are utilized to mount a series of elongated forks 46 disposed parallel to one another, and aligned in a direction extending transversely of conveyer means 10. Depending leg portion 48, at the butt or rear ends of forks 46, extend downwardly adjacent the forward sides of tubes 40, 41, and these are detachably secured to tubes 40, 41 by bracket halves 50a, 50b and nut and bolt assemblies 52. The forward end or tine portions 47 of the forks project forwardly of the tubes, and their upper or top surfaces define a common support plane, which is approximately horizontal (although not exactly so as will hereinafter be described).

The forks as mounted on the tubes are interspersed in the spaces between laterally adjacent rows of skate rollers, and on vertical movement of shiftable section 38 are shifted from the lowered retracted position shown in dashed outline and indicated at 46A in FIG. 1, to the raised retracted position shown in dashed outline and indicated at 46B. In their lowered position, the top surfaces of the forks are below the support plane of conveyer section 22, and in their raised position, the top surfaces are above this support plane. The mounting for the forks enables adjustments to be made in their position on the shiftable section.

As probably best can be seen with reference to FIG. 7, the top of each fork is provided with a shoulder 56. On picking up a layer of boards and then shifting the layer forwardly, the shoulders of the forks prevent back sliding of the boards along the forks to the rear of the shoulders.

Considering now the construction of carriage structure 36, this comprises a pair of shiftable mountings 60 (one being obscured by the other in FIG. 1), spaced adjacent opposite sides of conveyer means 10 and beneath it. Interconnecting the mountings, and fixed to each, is an elongated and rigid tube or member 64, that extends transversely of the apparatus substantially parallel to tubes 40, 41. The mountings are slidably supported on guides, such as guides 66, for horizontal movement beneath conveyer section 22 in a direction paralleling the movement of boards thereover.

Shiftable section 38 is mounted on structure 36 by means of pivoted links 68, with such links being pivotally connected at one set of ends to struts 44, and at their opposite set of ends to plates 72 secured to tube 64.

Carriage structure 36 and shiftable section 38 accommodate positioning of forks 46 in four different positions. Two positions already have been discussed, i.e., the lowered retracted position shown at 46A, and the raised retracted position shown at 46B. In these positions of the forks, the carriage structure is retracted, and in the position shown in dashed outline in FIG. 1 and indicated at 36A. Should the carriage structure be shifted forwardly, to the position shown for the carriage in solid lines, with the forks raised, the forks are moved to raised extended position. Upon lowering of the forks with the carriage structure forward, the forks reach their lowered extended position, which is the position of the forks indicated in solid outline in FIG. 1, and the position shown in FIG. 7.

Power-operated means is provided for moving the carriage structure to and fro, and for shifting shiftable section 38 up and down. Specifically, connected to each mounting 60 is the rod end of a fluid-operated ram or jack 80. The cylinder end of the ram or jack is suitably secured to frame 24 behind the carriage structure. Interposed between each mounting 60 and upper tube 41 of the shiftable section is a fluid-operated ram or jack 84, with the cylinder end thereof connected to tube 41 and the rod end thereof connected to the mounting. Upon extension of rams 84 section 38 is shifted upwardly, and on contraction of the rams the section is lowered. Upon extension of rams 80 the carriage structure is shifted forwardly and on contraction of the rams it is retracted. The various positions may be determined by the length of stroke in the rams.

In many stackers, the conveyer means 10 may be relatively wide, due to the lengths of the boards handled. Thus, it is preferably that equalizer means be provided operable to equate the movement of a mounting 60 on one side of the apparatus exactly to the movement of the mounting 60 on the other side. It is also advantageous that equalizer structure be provided for equating upward movement of one end of the shiftable section exactly to upward movement of its other end.

Thus, in the embodiment of the invention illustrated (still referring to FIG. 1), secured to frame 24 under each mounting 60, more particularly under guide 66 supporting the mounting, is an elongated rack 88. Meshing with the teeth of each rack are the teeth of a pinion gear 90. The pinion gears for the two mountings are interconnected by a transversely extending shaft 92, secured to each pinion gear. Shaft 92 is journaled in bearing structure 94 dependently supported by each mounting 60. The structure is effective to equalize the movement of both mountings 60, as shaft 92 prevents the pinion gear of one mounting from rotating at any speed different from the speed of the other pinion gear.

Equalizing movement of the ends of shiftable section 38 is a transversely extending torque tube 96 (see FIG. 6). Pairs of links 97a, 97b, with a pair adjacent each end of tube 96, are pivotally interconnected between plates 72 secured to tube 64, and struts 44 secured to tubes 40, 41, as are links 68. The inner links 97a of each pair is rigidly connected to the adjacent end of tube 96. The effect of the structure is that on upward movement of one end of shiftable section 38, the link 97a adjacent the end is pivoted, with twisting of tube 96 connected to the link and a corresponding pivotal movement produced in the link 97a adjacent the other end of section 38 resulting.

A feature of the invention is that a substantially continuous flow of boards can be fed to the stacker on conveyor means 10, and the actual stacking operation performed so rapidly that no substantial backlog of boards ever collects on the conveyer means 10 to the rear of conveyer section 22. Facilitating the rapid flow of boards through the apparatus is a novel brake means or mechanism 100, that functions to stop the forward travel of boards along conveyer means 10 at a location above the butt end of the forks (or inwardly from the off-bearing end of the conveyor means) when the forks are initially raised from their lowered retracted position. After raising of the forks, when they then are shifted forwardly, the forks carry with them boards that formerly rested on conveyer section 22 above the forks, with the advance of succeeding boards halted momentarily. This enables the forks to operate without being encumbered by the succeeding boards. The braking is only momentary, however, and after movement of the forks a part of the distance to their extended position, the braking is stopped and conveyer section 22 is freed to receive another layer of edge-butted boards.

Thus, and with reference to FIG. 1, pivoted to frame members 24a of frame 24, and adjacent the rear end of conveyer section 22, are pressure members or lifters such as member 102. These may be provided at regular intervals across the width of the conveyer section; for instance, one may be provided for each row of skate rollers 30. Fastened to the underside of each pressure member is an elongated spring 104, that curves downwardly and then forwardly to a position over tube 41 of shiftable section 38 with the carriage structure retracted. The forward ends of pivoted members 102 are disposed beneath a bumper or bar 106, in the form of a stationary, elongated tube structure above conveyer section 22 and extending transversely thereacross.

As can be seen with reference to the dashed outline of a pressure member 102 in FIG. 1, when shiftable section 38 is raised, tube 41 comes into contact with springs 104 and is effective to exert an upward force on the pressure members 102, with the members as a result moving upwardly against the underside of bumper 106. If a board is between the tops of members 102 and the base of bumper 106, it is lifted by this action and then frictionally grabbed on both sides with the spring producing a yieldable clamping pressure. If there should be no board between members 102 and the bumper, the lifters or pressure members move firmly against the underside of the bumper, and a tight contact results that prevents the forward travel of boards.

The braking action is continued until tube 41 moves forwardly of the forward ends of springs 104 on forward movement of the carriage structure. This occurs on the carriage moving only a fraction of the total forward distance it travels on moving from a retracted to an extended position. Immediately upon the release of the springs, the pressure members return by gravity to their normal lowered position, where their tops are below the support plane of the skate rollers, thus to enable newly fed boards to travel forwardly and be crowded against blocks 32.

Considering now stacking station 18, the station includes a platform 120 providing a depository for boards after their removal from conveyer means 10, such platform being shiftable vertically downwardly by degrees enabling the top of a stack of boards forming thereon to be maintained at a uniform loading elevation. The station also comprises a series of hopper structures 124, constructed to hold spacers or stickers, which are ejected one at a time from a hopper structure on top of a forming stack.

Referring now to FIGS. 1, 2, and 3, within the confines of vertical uprights 24b of frame 24 are a pair of spaced-apart stands, indicated at 130, 132. Stands 130, 132 support, adjacent the top of the apparatus, a shiftable subframe 134, movable up and down on the stands, and adjacent the base of the apparatus another shiftable subframe 136, also movable up and down.

Subframe 134 comprises beams 140, 141 extending between opposite sides of the apparatus, and connected at adjacent sets of ends by plates 142. The plate 142 at each set of ends of the beams is secured, as by nut and bolt assemblies 144, to a hoist carriage structure 148 mounted on a stand. Each hoist carriage structure is provided with rollers 150 suitably journaled thereon, that guide the hoist carriage structure during its movement. Power-operated means is provided in each stand, for moving the hoist carriage structure mounted thereon. In the embodiment illustrated, such means takes the form of a ram or jack 156, with its rod end connected to the hoist carriage structure, and its cylinder end connected to the stand adjacent the top thereof.

As can be seen with reference to FIGS. 1 and 4, hopper structures 124 extend transversely of beams 140, 141 (and transversely of boards traveling on conveyer means 10) and are detachably secured to the beams, as by nut and bolt assemblies 158. (In FIGS. 2 and 3, the hopper structures have been removed from the drawings.) The hopper structures thus also extend transversely of boards in a forming stack. Since all the hopper structures are mounted on a common frame (the shiftable subframe 134), on lowering of subframe 134 through lowering of hoist carriage structures 148, the hopper structures are lowered in unison. Conversely, when the subframe is raised, the hopper structures are raised in unison. The hopper structures, as will hereinafter become apparent, are lowered to place them directly over a stack, in position to eject stickers thereon, and they are raised to clear the top of a stack thus to enable another layer of boards to be placed on the stack.

With reference now to FIGS. 4 and 5, each hopper structure comprises hollow casing structure 160, shaped to receive multiple stickers 161 stacked one on top of another. At the base of each casing structure is a floor plate 164 that supports the base of the stack of stickers. Along the length of casing 160, and adjacent but above floor plate 164, is an opening 166, and guide structure 168, which enables a sticker to be shifted laterally from the casing, with such then falling downwardly from the side of the casing, as illustrated by the bottommost sticker shown in dashed outline in FIG. 5.

A sticker is ejected from the base of a hopper structure, by ejecting mechanism provided each hopper structure, and indicated at 170. Each mechanism 170 comprises an ejector member, such as the one indicated at 172, that is operable when actuated to move toward the bottom sticker in a stack and engage it at points spaced along the length of the sticker whereby the sticker is shoved outwardly through opening 166. In the embodiment of the invention shown, the ejector member includes pins 174 that move into apertures 176 in casing structure 160 thus to contact a sticker.

An ejector member is moved back and forth by toggle link structure 178, actuated by a bar 180 and ram 182. A single stroke of the ram is effective to move the toggle links of link structure 178 past an overcenter position, with in and out movement of the ejector member actuated thereby resulting, and the ejection of a single sticker.

An important feature of the invention is that the hopper structures are adjustable in position along the length of beams 140, 141 (the latter constituting mounting means in the construction), and that a separate ram 182 is provided each hopper structure for actuating its ejecting mechanism. This gives flexibility to the operation of the stacker. It will be remembered that the forks of the pickup section are adjustably positionable along tubes 40, 41. This is to enable the selection of the optimum number of forks, and an optimum spacing for the forks, for a given type of board handled. The type of board handled and the type of stacking desired also affects the optimum spacing and number of stickers required in a stack. By actuating the rams of the ejecting mechanisms for only selected ones of the hopper structures, the number of stickers deposited on top of a forming stack is reduced from the number that could be deposited were all the rams actuated. Similarly, by shifting the position of the hopper structures along the beams, the placement of the stickers may be changed. This variability in operation is an extremely desirable feature.

Considering now platform 120 and associated structure, and with reference again to FIGS. 1, 2, and 3, the platform is supported on subframe 136, comprising elongated beams 190, 191 extending between stands 130, 132. Connecting adjacent sets of ends of the beams are plates such as plates 194. Plates 194, in turn, are connected to hoist carriage structures mounted in stands 130, 132, such as structure 196, similar to carriage structures 148. Hoist carriage structures 196 are provided with rollers 198 that guide the carriage structures for movement up and down on the stands. Movement of the hoist carriage structures is produced by elongated rams, such as ram 200, one being provided the carriage structure in each stand.

Platform 120 comprises a lower section 120a, that is fixed to beams 190, 191, and an upper section 120b that is loose from the lower section. Journaled along the top of the upper section are skate rollers 204, provided to facilitate the movement of a completed stack of lumber off to one side of the platform when the stack is unloaded. Interposed between upper section 120b and lower section 120a are pins 206 pivoted at their upper set of ends on the upper platform section. The pins extend through lower section 120a, and their bottom ends are loosely received within tubular receivers 208 joined to beams 190, 191. The pins and tubular receivers functions properly to position the upper platform section on the lower one, even though the upper section is loosely supported on the lower one.

Beneath platform 120 is a stationary subplatform 210 including beams 211. Platform 210 is provided with upstanding stud rests 212 joined to beams 211. Apertures 213 are provided in the lower platform section that enable stud rests 212 to extend through the lower platform section when the same is lowered over the stud rests. There are also recesses 214 provided in the upper platform section for seating the ends of the stud rests. It is to be noted that the stud rest shown on the left side of the subplatform in FIG. 1 is somewhat longer than the one shown on the right. Because of such a difference in height, on complete lowering of platform 120 the upper platform section is canted or tilted, in the manner shown by the dashed outline for the upper section in FIG. 1. The tilt promotes rolling of a completed stack off the platform and to the right in FIG. 1, where it normally would be received by a suitable conveyer (not shown). The tilt of the upper platform section, of course, is removed on raising of platform 120, since as soon as the stud rests are withdrawn the upper platform section settles down in a horizontal position on the lower platform section.

To assure that during operation of the stacker opposite ends of subframe 134 mounting the hopper structures, and opposite ends of subframe 136 mounting platform 120, move up and down at the same rate, an equalizer means is provided each subframe equating movement of its two ends.

Thus, and considering first of all subframe 134 (reference is made to FIGS. 2 and 3), at 215 there is indicated an elongated torque tube journaled on subframe 134 and having ends protruding outwardly at each end of the subframe. Fixed to these ends of the torque tube are arms 216. Arms 216 are link-connected by links such as link 218 to the top of stands 130, 132. When the upper subframe is moved downwardly, for instance, the arm and link combination adjacent each end of the torque tube twists the torque tube a predetermined amount, and since the torque tube is rigid, the twist of the tube at opposite ends is equalized.

In the case of the subframe 136, the equalizer means includes a rack such as rack 220 secured to each stand adjacent end end of the subframe. Meshing with the teeth of each rack are the teeth of a pinion gear 222. The pinion gears 222 at opposite ends of the subframe are interconnected by a transversely extending shaft 224 journaled on the subframe that is fixed to the pinion gears. As in the case of the equalizer means discussed in connection with carriage structure 36, movement of either pinion gear in a linear path is accompanied by rotation of the gear, and since the two gears are interconnected by shaft 224 they are constrained to equal amounts of rotation.

As earlier mentioned, the support plane of forks 46 is approximately horizontal, but not exactly so. This is because the forks are tapered, as perhaps most clearly shown in FIG. 7. The top surfaces of tine portions 47 of the forks define a plane that is inclined slightly with respect to a horizontal, with such plane being lower at the unjoined ends of the forks than at the butt or joined ends of the forks.

The support plane of platform 120 is horizontal, and stickers 161 of uniform width are used during the making of a stack. Further, the loading elevation of the stack is such that with the forks in their lowered, extended position (as in FIGS. 1 and 7) the support plane of the unjoined end of the forks is below the tops of the stickers, whereas at the butt end of the forks, the support plane is above the tops of the stickers. As a consequence, when the forks are dropped from their extended raised to their extended lowered position, part of the boards carried on the forks come to rest on the stickers, part remain at rest on the forks, and part are partially supported by both the forks and the stickers. When the forks are then withdrawn while lowered, a distributing action in the boards takes place, with those supported mostly or entirely on the forks being shifted backwardly as the forks are withdrawn. This distributing action is utilized in making a stack with even sides, as will be more fully described.

Referring to FIGS. 1 and 6, a stationary stop means, in the form of shoes 230 secured to the ends of frame members 24a, is provided for vertically aligning the edges of boards along the side of the forming stack that is closer to forks 46. The mounting for shoes 230 is such that adjustment in their position is possible. Another stop means, represented by shoes such as shoe 234 secured by an adjustable mounting to beam 236, is provided for vertically aligning the edges of boards along the opposite side of the stack. The adjustment possible in the position of the shoes enables changes to be made in the width of the stack produced.

Explaining now briefly the operation of the apparatus, shiftable subframe 136 is first adjusted to place platform 120 thereon at loading elevation, such being at approximately the level indicated by line 238 in FIG. 1. Assuming that a layer of edge-butted boards has collected on conveyor section 22 against blocks 32, pickup section 14 is actuated to first raise the forks in their retracted position, with such raising lifting boards from off conveyor section 22. At the same time, brake means 100 is actuated, momentarily to prevent the feed of boards forwardly on conveyor section 22.

Upon carriage structure 36 then being shifted forwardly, the forks are moved beyond the off-bearing end of conveyor section 22, and the layer of boards carried on the forks are moved over and beyond blocks 32, and thence over platform 120. With the forks fully raised and extended, stop means 134 engages the edge of the board carried nearest the outer ends of the forks, and thus serves properly to line up boards on the right of the stack in FIG. 1.

Assuming also that suitable stickers have already been deposited on platform 120, when the forks are then shifted from their raised extended to their lowered extended position, the boards on the right of the stack in FIG. 1 will come to rest on the stickers, while those boards to the left of the stack remain supported by the forks, generally as indicated in FIG. 7. If the forks are then withdrawn while lowered, boards entirely on or receiving their major support from the forks are shifted toward stop means 230, with the boards thus being spaced somewhat and stop means 230 functioning properly to line up boards on the left side of the stack in FIG. 1.

The forks when returned to their lowered retracted position are in proper position for the cycle to repeat. Before depositing another layer of boards, stickers are placed on the top of the stack by lowering subframe 134 and the hopper structures mounted thereon and actuating their ejecting mechanisms. Platform 120 is also lowered to place the top of the stack at proper loading elevation.

In conclusion, it should be noted that rams are used to actuate the various mechanisms described, and that the apparatus generally is devoid of complicated gearing and power-transmitting mechanism. Where plural rams move a unitary mechanism, movement of the rams is coordinated in a novel manner by the equilizing structures described. Many operating movements in the apparatus may be accomplished simultaneously with other operating movements, with a corresponding speed up in the stacking process.

While a specific embodiment of the invention has been described, it should be appreciated that various modifications and changes are possible, without departing therefrom. It is desired and intended to cover all modifications and variations that would be apparent to one skilled in the art, and that come within the scope of the appended claims.

It is claimed and desired to secure by Letters Patent:

1. In mechanism of the character described for stacking lumber: conveyor means with feed and off-bearing ends comprising a plurality of conveyor units spaced from one another transversely of the length of said conveyor means and defining a first support plane; a pick-up section adjacent to the off-bearing end of said conveyor means having forks paralleling and interspaced between a plurality of said conveyor units of said conveyor means and defining a second support plane located below said support plane of said conveyor means with said forks in one position; first means for moving said forks from their said one position upwardly while maintaining said second support plane of said forks parallel to the position which it occupies when said forks are in their said first position to place said second support plane of said forks above said first support plane of said conveyor means; second means for moving said forks forwardly with said second support plane of said forks above said first support plane of said conveyor means to an extended position where said second support means of said forks is beyond said off-bearing end of said conveyor means; third means for moving said forks downwardly to a lowered extended position; fourth means for subsequently moving said forks retractively to their said one position; a depository having an approximately horizontal third support plane at the off-bearing end of said conveyor means for receiving articles from said forks when in their lower extended position; and means for lowering said depository in steps as articles are stacked thereon whereby the top of a stack as it is formed on said third support plane of said depository may be maintained at a substantially uniform loading level.

2. In mechanism of the character described for stacking lumber: conveyor means with feed and off-bearing ends comprising a plurality of conveyor units spaced from one another transversely of the length of said conveyor means and defining a first support plane; a stop adjacent to the off-bearing end of said conveyor means for preventing lumber from dropping off said off bearing end of said conveyor means; a pick-up section adjacent to the off-bearing end of said conveyor means having forks paralleling and interspaced between a plurality of said conveyor units of said conveyor means and defining a second support plane located below said support plane of said conveyor means with said forks in one position; first means for moving said forks from their said one position upwardly while maintaining said second support plane of said forks parallel to the position which it occupies when said forks are in their said first position to place said second support plane of said forks above said first support plane of said conveyor means; second means for moving said forks forwardly with said second support plane of said forks above said first support plane of said conveyor means to an extended position where said second support means of said forks is beyond said off-bearing end of said conveyor means; third means for moving said forks downwardly to a lowered extended position; fourth means for subsequently moving said forks retractively to their said one position; a depository having an approximately horizontal third support plane at the off-bearing end of said conveyor means for receiving articles from said forks when in their lower extended position; and means for lowering said depository in steps as articles are stacked thereon whereby the top of a stack as it forms on said third support plane of said depository may be maintained at a substantially uniform loading level.

3. In mechanism of the character described for stacking lumber: conveyor means wtih feed and off-bearing ends comprising a plurality of conveyor units spaced from one another transversely of the length of said conveyor means and defining a first support plane; a pick-up section adjacent to the off-bearing end of said conveyor means having forks paralleling and inter-spaced between a plurality of said conveyor units of said conveyor means and defining a second support plane located below said support plane of said conveyor means with said forks in one position; first means for moving said forks from their said one position upwardly while maintaining said second support plane of said forks parallel to the position which it occupies when said forks are in their said first position to place said second support plane of said forks above said first support plane of said conveyor means; second means for moving said forks forwardly with said second support plane of said forks above said first support plane of said conveyor means to an extended position where said second support means of said forks is beyond said off-bearing end of said conveyor means; third means for moving said forks downwardly to a lowered extended position; fourth means for subsequently moving said forks retractively to their said one position; a depository having an approximately horizontal third support plane at the off-bearing end of said conveyor means for receiving articles from said forks when in their lower extended position; means for lowering said depository in steps as articles are stacked thereon whereby the top of a stack as it forms on said third support plane of said depository may be maintained at a substantially uniform loading level; means operative upon the movement of said forks to raise said second support plane of said forks above said first support plane of said conveyor means for stopping the forward travel of lumber on said conveyor means to the rear of said forks only during a limited initial forward movement of said forks.

4. In mechanism of the character described for stacking lumber: conveyor means with feed and off-bearing ends comprising a plurality of conveyor units spaced from one another transversely of the length of said conveyor means and defining a first support plane; a stop adjacent to the off-bearing end of said conveyor means for preventing lumber from dropping off said off-bearing end of said conveyor means; a pick-up section adjacent to the off-bearing end of said conveyor means having forks paralleling and interspaced between a plurality of said conveyor units of said conveyor means and defining a second support plane located below said support plane of said conveyor means with said forks in one position; first means for moving said forks from their said one position upwardly while maintaining said second support plane of said forks parallel to the position which it occupies when said forks are in their said first position to place said second support plane of said forks above said first support plane of said conveyor means; second means for moving said forks forwardly with said second support plane of said forks above said first support plane of said conveyor means to an extended position where said second support means of said forks is beyond said off-bearing end of said conveyor means; third means for moving said forks downwardly to a lowered extended position; fourth means for subsequently moving said forks retractively to their said one position; a depository having an approximately horizontal third support plane at the off-bearing end of said conveyor means for receiving articles from said forks when in their lower extended position; means for lowering said depository in steps as articles are stacked thereon whereby the top of a stack as it forms on said third support plane of said depository may be maintained at a substantially uniform loading level; means operative upon the movement of said forks to raise said second support plane of said forks above said first support plane of said conveyor means for stopping the forward travel of lumber on said conveyor means to the rear of said forks only during a limited initial forward movement of said forks.

5. In mechanism of the character described for stacking lumber: conveyor means with feed and off-bearing ends comprising a plurality of conveyor units spaced from one another transversely of the length of said conveyor means and defining a first support plane; a pick-up section adjacent to the off-bearing end of said conveyor means having forks paralleling and interspaced between a plurality of said conveyor units of said conveyor means and defining a second support plane located below said support plane of said conveyor means with said forks in one position; first means for moving said forks from their said one position upwardly while maintaining said second support plane of said forks parallel to the position which it occupies when said forks are in their said first position to place said second support plane of said forks above said first support plane of said conveyor means; second means for moving said forks forwardly with said second support plane of said forks above said first support plane of said conveyor means to an extended position where said second support means of said forks is beyond said off-bearing end of said conveyor means; third means for moving said forks downwardly to a lowered extended position; fourth means for subsequently moving said forks retractively to their said one position; a depository having an approximately horizontal third support plane at the off-bearing end of said conveyor means for receiving articles from said forks when in their lower extended position; means for lowering said depository in steps as articles are stacked thereon whereby the top of a stack as it is formed on said third support plane of said depository may be maintained at a substantially uniform loading level; and means for placing spacing sticks upon the successive layers of lumber delivered to said depository by said backup section.

6. In mechanism of the character described for stacking lumber: conveyor means with feed and off-bearing ends comprising a plurality of conveyor units spaced from one another transversely of the length of said conveyor means and defining a first support plane; a stop adjacent to the off-bearing end of said conveyor means for preventing lumber from dropping off said off-bearing end of said conveyor means; a pick-up section adjacent to the off-bearing end of said conveyor means having forks paralleling and interspaced between a plurality of said conveyor units of said conveyor means and defining a second support plane located below said support plane of said conveyor means with said forks in one position; first means for moving said forks from their said one position upwardly while maintaining said second support plane of said forks parallel to the position which it occupies when said forks are in their said first position to place said second support plane of said forks above said first support plane of said conveyor means; second means for moving said forks forwardly with said second support plane of said forks above said first support plane of said conveyor means to an extended position where said second support means of said forks is beyond said off-bearing end of said conveyor means; third means for moving said forks downwardly to a lowered extended position; fourth means for subsequently moving said forks retractively to their said one position; a depository having an approximately horizontal third support plane at the off-bearing end of said conveyor means for receiving articles from said forks when in their lower extended position; means for lowering said depository in steps as articles are stacked thereon whereby the top of a stack as it forms on said third support plane of said depository may be maintained at a substantially uniform loading level; and means for placing spacing sticks upon the successive layers of lumber delivered to said depository by said backup section.

7. In mechanism of the character described for stacking lumber: conveyor means with feed and off-bearing ends comprising a plurality of conveyor units spaced from one another transversely of the length of said conveyor means and defining a first support plane; a pick-up section adjacent to the off-bearing end of said conveyor means having forks paralleling and interspaced between a plurality of said conveyor units of said conveyor means and defining a second support plane located below said support plane of said conveyor means with said forks in one position; first means for moving said forks from their said one position upwardly while maintaining said second support plane of said forks parallel to the position which it occupies when said forks are in their said first position to place said second support plane of said forks above said first support plane of said conveyor means; second means for moving said forks forwardly with said second support plane of said forks above said first support plane of said conveyor means to an extended position where said second support means of said forks is beyond said off-bearing end of said conveyor means; third means for moving said forks downwardly to a lowered extended position; fourth means for subsequently moving said forks retractively to their said one position; a depository having an approximately horizontal third support plane at the off-bearing end of said conveyor means for receiving articles from said forks when in their lower extended position; means for lowering said depository in steps as articles are stacked thereon whereby the top of a stack as it forms on said third support plane of said depository may be maintained at a substantially uniform loading level; means operative upon the movement of said forks to raise said second support plane of said forks above said first support plane of said conveyor means for stopping the forward travel of lumber on said conveyor means to the rear of said forks only during a limited initial forward movement of said forks; and means for placing spacing sticks upon the successive layers of lumber delivered to said depository by said backup section.

8. In mechanism of the character described for stacking lumber: conveyor means with feed and off-bearing ends comprising a plurality of conveyor units spaced from one another transversely of the length of said conveyor means and defining a first support plane; a stop adjacent to the off-bearing end of said conveyor means for preventing lumber from dropping off said off-bearing end of said conveyor means; a pick-up section adjacent to the off-bearing end of said conveyor means having forks paralleling and interspaced between a plurality of said conveyor units of said conveyor means and defining a second support plane located below said support plane of said conveyor means with said forks in one position; first means for moving said forks from their said one position upwardly while maintaining said second support plane of said forks parallel to the position which it occupies when said forks are in their said first position to place said second support plane of said forks above said first support plane of said conveyor means; second means for moving said forks forwardly with said second support plane of said forks above said first support plane of said conveyor means to an extended position where said second support means of said forks is beyond said off-bearing end of said conveyor means; third means for moving said forks downwardly to a lowered extended position; fourth means for subsequently moving said forks retractively to their said one position; a depository having an approximately horizontal third support plane at the off-bearing end of said conveyor means for receiving articles from said forks when in their lower extended position; means for lowering said depository in steps as articles are stacked thereon whereby the top of a stack as it forms on said third support plane of said depository may be maintained at a substantially uniform loading level; means operative upon the movement of said forks to raise said second support plane of said forks above said first support plane of said conveyor means for stopping the forward travel of lumber on said conveyor means to the rear of said forks only during a limited initial forward movement of said forks; and means for placing spacing sticks upon the successive layers of lumber delivered to said depository by said backup section.

9. In mechanism of the character described for stacking lumber: conveyor means with feed and off-bearing ends comprising a plurality of conveyor units spaced from one another transversely of the length of said conveyor means and defining a first support plane; a pick-up section adjacent to the off-bearing end of said conveyor means having forks paralleling and interspaced between a plurality of said conveyor units of said conveyor means and defining a second support plane located below said support plane of said conveyor means with said forks in one position; first means for moving said forks from theirs said one position upwardly while maintaining said second support plane of said forks parallel to the position which it occupies when said forks are in their said first position to place said second support plane of said forks above said first suport plane of said conveyor means; second means for moving said forks forwardly with said second support plane of said forks above said first support plane of said conveyor means to an extended position where said second support means of said forks is beyond said off-bearing end of said conveyor means; third means for moving said forks downwardly to a lowered extended position; fourth means for subsequently moving said forks retractively to their said one position; a depository having an approximately horizontal third support plane at the off-bearing end of said conveyor means for receiving articles from said forks when in their lower extended position; means for lowering said depository in steps as articles are stacked thereon whereby the top of a stack as it forms on said third support plant of said depository may be maintained a substantially uniform loading level; and a vertically reciprocable carriage overlying said depository; a plurality of supplies of spacing sticks carried by said carriage at spaced intervals along said carriage; means for reciprocating said carriage between an elevated position wherein the lower part of said carriage is spaced above said stack and a lowered deposit position; means activated upon substantial completion of carriage movement to said lowered deposit position for effecting deposit of the lowermost spacing stick from each supply onto said stack; said carriage moving upward from said lowered deposit position prior to positioning of the succeeding layer of lumber on said stack.

10. In mechanism of the character described for stacking lumber: conveyor means with feed and off-bearing ends comprising a plurality of conveyor units spaced from one another transversely of the length of said conveyor means and defining a first support plane; a stop adjacent to the off-bearing end of said conveyor means for preventing lumber from dropping off said off-bearing end of said conveyor means; a pick-up section adjacent to the off-bearing end of said conveyor means having forks paralleling and interspaced between a plurality of said conveyor units of said conveyor means and defining a second support plane located below said support plane of said conveyor means with said forks in one position; first means for moving said forks from their said one position upwardly while maintaining said second support plane of said forks parallel to the position which it occupies when said forks are in their said first position to place said second support plane of said forks above said first support plane of said conveyor means; second means for moving said forks forwardly with said second support plane of said forks above said first support plane of said conveyor means to an extended position where said second support means of said forks is beyond said off-bearing end of said conveyor means; third means for moving said forks downwardly to a lowered extended position; fourth means for subsequently moving said forks retractively to their said one position; a depository having an approximately horizontal third support plane at the off-bearing end of said conveyor means for receiving articles from said forks when in their lower extended position; means for lowering said depository in steps as articles are stacked thereon whereby the top of a stack as it forms on said third support plane of said depository may be maintained at a substantially uniform loading level; and a vertically reciprocable carriage overlying said depository; a plurality of supplies of spacing sticks carried by said carriage at spaced intervals along said carriage; means for reciprocating said carriage between an elevated position wherein the lower part of said carriage is spaced above said stack and a lowered deposit position; means activated upon substantial completion of carriage movement to said lowered deposit position for effecting deposit of the lowermost spacing stick from each supply onto said stack; said carriage moving upward from said lowered deposit position prior to positioning of the succeeding layer of lumber on said stack.

11. In mechanism of the character described for stacking lumber: conveyor means with feed and off-bearing ends comprising a plurality of conveyor units spaced from one another transversely of the length of said conveyor means and defining a first support plane; a pick-up section adjacent to the off-bearing end of said conveyor means having forks paralleling and interspaced between a plurality of said conveyor units of said conveyor means and defining a second support plane located below said support plane of said conveyor means with said forks in one position; first means for moving said forks from their said one position upwardly while maintaining said second support plane of said forks parallel to the position which it occupies when said forks are in their said first position to place said second support plane of said forks above said first support plane of said conveyor means; second means for moving said forks forwardly with said second support plane of said forks above said first support plane of said conveyor means to an extended position where said second support means of said forks is beyond said off-bearing end of said conveyor means; third means for moving said forks downwardly to a lowered extended position; fourth means for subsequently moving said forks retractively to their said one position; a depository having an approximately horizontal third support plane at the off-bearing end of said conveyor means for receiving articles from said forks when in their lower extended position; means for lowering said depository in steps as articles are stacked thereon whereby the top of a stack as it forms on said third support plane of said depository may be maintained at a substantially uniform loading level; means operative upon the movement of said forks to raise said second support plane of said forks above said first support plane of said conveyor means for stopping the forward travel of lumber on said conveyor means to the rear of said forks only during a limited initial forward movement of said forks; and a vertically reciprocable carriage overlying said depository; a plurality of supplies of spacing sticks carried by said carriage at spaced intervals along said carriage; means for reciprocating said carriage between an elevated position wherein the lower part of said carriage is spaced above said stack and a lowered deposit position; means activated upon substantial completion of carriage movement to said lowered deposit position for effecting deposit of the lowermost spacing stick from each supply onto said stack; said carriage moving upward from said lowered deposit position prior to positioning of the succeeding layer of lumber on said stack.

12. In mechanism of the character described for stacking lumber: conveyor means with feed and off-bearing ends comprising a plurality of conveyor units spaced from one another transversely of the length of said conveyor means and defining a first support plane; a stop adjacent to the off-bearing end of said conveyor means for preventing lumber from dropping off said off-bearing end of said conveyor means; a pick-up section adjacent to the off-bearing end of said conveyor means having forks paralleling and interspaced between a plurality of said conveyor units of said conveyor means and defining a second support plane located below said support plane of said conveyor means with said forks in one position; first means for moving said forks from their said one position upwardly while maintaining said second support plane of said forks parallel to the position which it occupies when said forks are in their said first position to place said second support plane of said forks above said first support plane of said conveyor means; second means for moving said forks forwardly with said second support plane of said forks above said first support plane of said conveyor means to an extended position where said second support means of said forks is beyond said off-bearing end of said conveyor means; third means for moving said forks downwardly to a lowered extended position; fourth means for subsequently moving said forks retractively to their said one position; a depository having an approximately horizontal third support plane at the off-bearing end of said conveyor means for receiving articles from said forks when in their lower extended position; means for lowering said depository in steps as articles are stacked thereon whereby the top of a stack as it forms on said third support plane of said depository may be maintained at a substantially uniform loading level; means operative upon the movement of said forks to raise said second support plane of said forks above said first support plane of said conveyor means for stopping the forward travel of lumber on said conveyor means to the rear of said forks only during a limited initial forward movement of said forks; and a vertically reciprocable carriage overlying said depository; a plurality of supplies of spacing sticks carried by said carriage at spaced intervals along said carriage, means for reciprocating said carriage between an elevated position wherein the lower part of said carriage is spaced above said stack and a lowered deposit position; means activated upon substantial completion of carriage movement to said lowered deposit position for effecting deposit of the lowermost spacing stick from each supply onto said stack; said carriage moving upward from said lowered deposit position prior to positioning of the succeeding layer of lumber on said stack.

13. In lumber stacking apparatus, elongated substantially horizontal conveyor means with feed and off-bearing ends, carriage structure beneath said conveyor means mounted for movement in a direction substantially paralleling the movement of said conveyor means, said carriage structure including mountings adjacent opposite sides of said conveyor means mounted for horizontal movement therebeneath and an elongated member connecting said mountings and extending transversely of said conveyor means, an elongated shiftable section on said carriage structure extending transversely of said conveyor means, pivoted links connecting said shiftable section and said elongated member accommodating swinging of said shiftable section between raised and lowered positions, plural load-lifting forks mounted on said shiftable section having load-supporting surfaces positioned in a lowered position for said shiftable section below and in a raised position for said shiftable section above the support plane of said conveyor means, said forks being adjustable to multiple positions along the length of said shiftable section, at least one fluid-operated ram operatively connected to said carriage structure for moving it horizontally, at least one fluid-operated ram operatively connected to said shiftable section for moving it up and down, equalizer means interconnecting opposite end portions of said shiftable section operable to equate vertical movement of one end portion to vertical movement of the other, and equalizer means interconnecting opposite end portions of said carriage structure operable to equate horizontal movement of one end portion to horizontal movement of the other.

References Cited in the file of this patent

UNITED STATES PATENTS

| | | |
|---|---|---|
| 2,730,247 | Lawson | Jan. 10, 1956 |
| 2,838,188 | Mason | June 10, 1958 |
| 2,895,624 | Oster | July 21, 1959 |
| 2,915,202 | Aitken | Dec. 1, 1959 |
| 2,944,685 | Nicolazzi | July 12, 1960 |

FOREIGN PATENTS

| | | |
|---|---|---|
| 141,624 | Sweden | Aug. 4, 1953 |